United States Patent
So et al.

(10) Patent No.: US 7,167,954 B2
(45) Date of Patent: Jan. 23, 2007

(54) SYSTEM AND METHOD FOR CACHING

(75) Inventors: Kimming So, Palo Alto, CA (US); Jin Chin Wang, Union City, CA (US)

(73) Assignee: Broadcom Corporation, Irvine, CA (US)

( * ) Notice: Subject to any disclaimer, the term of this patent is extended or adjusted under 35 U.S.C. 154(b) by 185 days.

(21) Appl. No.: 10/294,091

(22) Filed: Nov. 14, 2002

(65) Prior Publication Data

US 2004/0049639 A1    Mar. 11, 2004

Related U.S. Application Data

(60) Provisional application No. 60/409,361, filed on Sep. 9, 2002, provisional application No. 60/409,256, filed on Sep. 9, 2002, provisional application No. 60/409,240, filed on Sep. 9, 2002.

(51) Int. Cl.
*G06F 12/00* (2006.01)
(52) U.S. Cl. ........................ 711/137; 711/132
(58) Field of Classification Search ................ 711/113, 711/119, 122, 123, 137, 132
See application file for complete search history.

(56) References Cited

U.S. PATENT DOCUMENTS

| | | | | |
|---|---|---|---|---|
| 5,261,066 A * | 11/1993 | Jouppi et al. | ................ | 711/122 |
| 5,345,560 A * | 9/1994 | Miura et al. | .................... | 711/3 |
| 5,784,711 A * | 7/1998 | Chi | ............................. | 711/213 |
| 5,790,823 A * | 8/1998 | Puzak et al. | ................. | 712/207 |
| 6,173,392 B1 * | 1/2001 | Shinozaki | .................... | 712/207 |
| 6,216,208 B1 * | 4/2001 | Greiner et al. | .............. | 711/137 |
| 6,594,730 B1 * | 7/2003 | Hum et al. | .................. | 711/137 |
| 6,636,945 B1 * | 10/2003 | Nakamura | .................. | 711/137 |
| 6,848,029 B1 * | 1/2005 | Coldewey | .................... | 711/137 |

OTHER PUBLICATIONS

Jim Handy, "The Cache Memory Book: the authoritative reference on the cache design," ☐☐Academic Press, Inc., Second edition, 1998. ☐☐pp. 18, 64-66.*

Tse et al., "CPU Cache Prefecting: timing Evaluation of Hardware Implementations," IEEE Transactions on Computers, vol. 47, No. 5, May 1998, pp. 509-526.*

* cited by examiner

*Primary Examiner*—Matthew Kim
*Assistant Examiner*—Sheng-Jen Tsai
(74) *Attorney, Agent, or Firm*—McAndrews, Held & Malloy, Ltd.

(57) ABSTRACT

Systems and methods that cache are provided. In one example, a system may include a spatial cache system coupled to a processing unit and to a memory. The spatial cache system may be adapted to reduce the memory latency of the processing unit. The spatial cache system may be adapted to store prefetched blocks, each stored prefetched block including a plurality of cache lines. If a cache line requested by the processing unit resides in one of the stored prefetched blocks and does not reside in the processing unit, then the spatial cache system may be adapted to provide the processing unit with the requested cache line.

40 Claims, 6 Drawing Sheets

SYSTEM AND METHOD FOR CACHING

RELATED APPLICATIONS

This application makes reference to, claims priority to and claims benefit from U.S. Provisional Patent Application Ser. No. 60/409,256, entitled "System and Method for Controlling Prefetching" and filed on Sep. 9, 2002; U.S. Provisional Patent Application Ser. No. 60/409,240, entitled "System and Method for Caching" and filed on Sep. 9, 2002; and U.S. Provisional Patent Application Ser. No. 60/409,361, entitled "System and Method for Directional Prefetching" and filed on Sep. 9, 2002.

INCORPORATION BY REFERENCE

The above-referenced United States patent applications are hereby incorporated herein by reference in their entirety.

BACKGROUND OF THE INVENTION

In many fields and applications, a control processor (e.g., central processing unit (CPU)) shares a memory with multiple devices via a memory controller. The CPU may, for example, handle interrupts, manage other functional resources and interact with users. To perform these tasks in a timely manner, the execution speed of the CPU is a substantial factor with respect to the overall system performance. Memory latency, in turn, is a substantial factor with respect to the execution speed. Unlike media processors, for example, that access memory in long data streams, the CPU may tend to access short streams of sequencing addresses. It is difficult to build a shared memory system that satisfies these different types of requests. Thus, the memory latency of the CPU may be long (e.g., tens of cycles) even if the memory bandwidth is high.

One solution to the memory latency problem employs the technique of prefetching. Prefetching may include, for example, loading particular data to storage close to the CPU in anticipation that the CPU may use the data in the near future.

In one conventional system, the CPU includes a level two (L2) cache. Such an approach may be costly and may negatively impact CPU performance. The L2 cache typically accommodates large line sizes and, as a result, may be quite large in size and may necessitate a large cache bandwidth. When the CPU accesses line x, the L2 cache control may prefetch the next sequential cache line x+1 into the L2 cache. Fetching more cache lines into the L2 cache may also increase capacity and bandwidth requirements. Furthermore, conventional L2 caches tend to keep cache lines that have already been accessed by the CPU under the assumption that the CPU may access the same cache lines in the future. Thus, conventional L2 caches are necessarily large in size and typically take up the most space in the CPU.

Another conventional system employs a stream buffer next to the caches of the CPU. Such a system may be complicated and slow. Each stream buffer is a first-in-first-out (FIFO) storage of a fixed number of cache lines to hold a stream with sequentially increasing address of CPU data. Typically, multiple stream buffers are used. The stream buffers are adapted, for an access, to perform a search of all buffers and all entries of each buffer. Additionally, the stream buffers are adapted to shift the buffer entries to maintain the FIFO structure. However, these adaptations may limit the overall capacity of the stream buffer and access time. Moreover, the stream buffer may not inherently be able to store data streams that are striding in reversed order.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may be found, for example, in systems and methods that provide caching. In one embodiment, the present invention may provide a system that caches data streams. The system may include, for example, a spatial cache system coupled to a processing unit and to a memory. The spatial cache system may be adapted to reduce memory latency of the processing unit. The spatial cache system may also be adapted to store prefetched blocks in which each stored prefetched block includes a plurality of cache lines. If a cache line requested by the processing unit resides in one of the stored prefetched blocks and does not reside in the processing unit, then the spatial cache system may be adapted to provide the processing unit with the requested cache line.

In another embodiment, the present invention may provide a method that reduces memory latency between a memory and a control processor. The method may provide a spatial cache system that is coupled to the memory and to the control processor. The spatial cache system may include, for example, blocks stored in a spatial cache. The blocks may include, for example, a plurality of cache lines. If a cache line requested by the control processor does not reside in the control processor and does reside in the spatial cache, then the spatial cache system may send the requested cache line to the control processor. If the cache line requested by the control processor does not reside in the control processor and does not reside in the spatial cache, then the spatial cache system may generate a missing block request and may generate a prefetch block request.

In yet another embodiment, the present invention may provide a method that reduces memory latency between a memory and a control processor. If a cache line miss occurs in the control processor, then a request for the missed cache line from the control processor may be received. It may be determined if the requested cache line resides in a spatial cache. If the requested cache line does reside in the spatial cache, then the requested cache line may be sent to the control processor. If the requested cache line does not reside in the spatial cache, then a missing block request and a prefetch block request may be generated.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
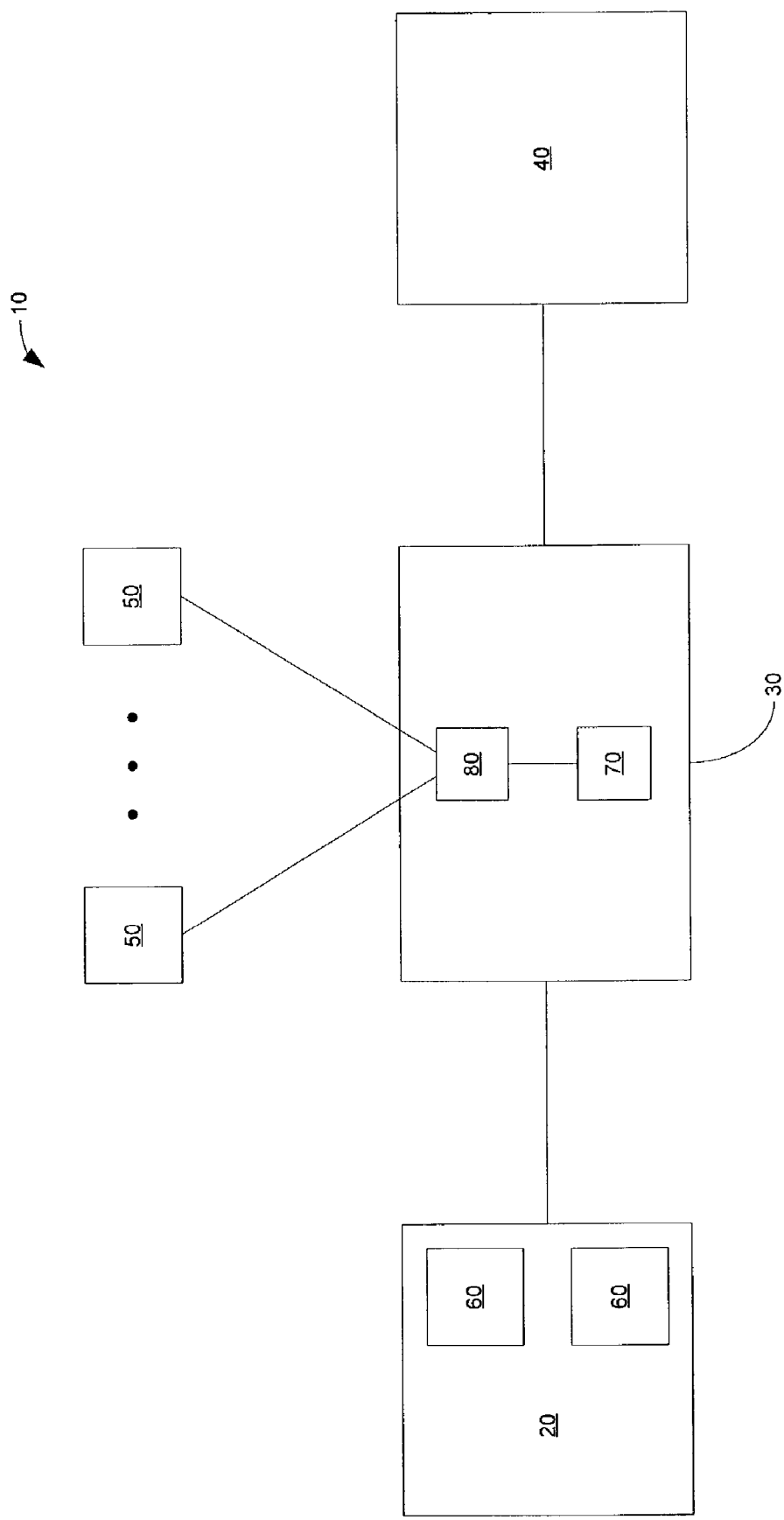
FIG. 1 shows a block diagram illustrating an embodiment of a system that caches data streams according to the present invention

FIG. 1 shows a block diagram illustrating an embodiment of a system that caches data streams according to the present invention. The system 10 may include, for example, a central processing unit (CPU) 20, a memory controller 30, a memory 40 and other system functional units 50. The CPU 20 may also include, for example, a cache 60. The cache 60 may include, for example, a level one (L1) cache and a level two (L2) cache which may be partitioned into cache lines. The memory controller 30 may include, for example, a spatial cache system 70 and a memory scheduler 80. The CPU 20 may be coupled to the memory controller 30 which, in turn, may be coupled to the memory 40. The spatial cache system 70 and the other functional units 50 may be coupled to the memory scheduler 80. Although the spatial cache system 70 is illustrated as part of the memory controller 30, the spatial cache system 70 may be separate from the memory controller 30.

The spatial cache system 70 may include, for example, a spatial cache and a set of controls that prefetch streams of data into the spatial cache system 70 to reduce the memory latency of the CPU 20. The control of the spatial cache system 70 may be adapted for one or more of the following: handling multiple misses sent from the CPU 20; prefetching ahead of the need by the CPU 20; invalidating lines as soon as the lines are used by the CPU 20; not expecting the CPU 20 to request the same line again from the spatial cache system 70; and replacing prefetched data if the CPU 20 starts to access other streams.

The spatial cache system 70 may also be adapted for sending, for example, one or more types of block requests to the memory 40. A block may include one or more cache lines. The spatial cache system 70 may be adapted to request a missing block from the memory 40 when, for example, a CPU cache line miss (i.e., the CPU 20 was unable to find a particular cache line in its cache 60) also misses the spatial cache system 70. The spatial cache system 70 may also request a prefetch block from the memory 40 when, for example, a particular block is determined by the spatial cache system 70 to be needed by the CPU 20 ahead of the actual need of the CPU 20.

Figure 2A:
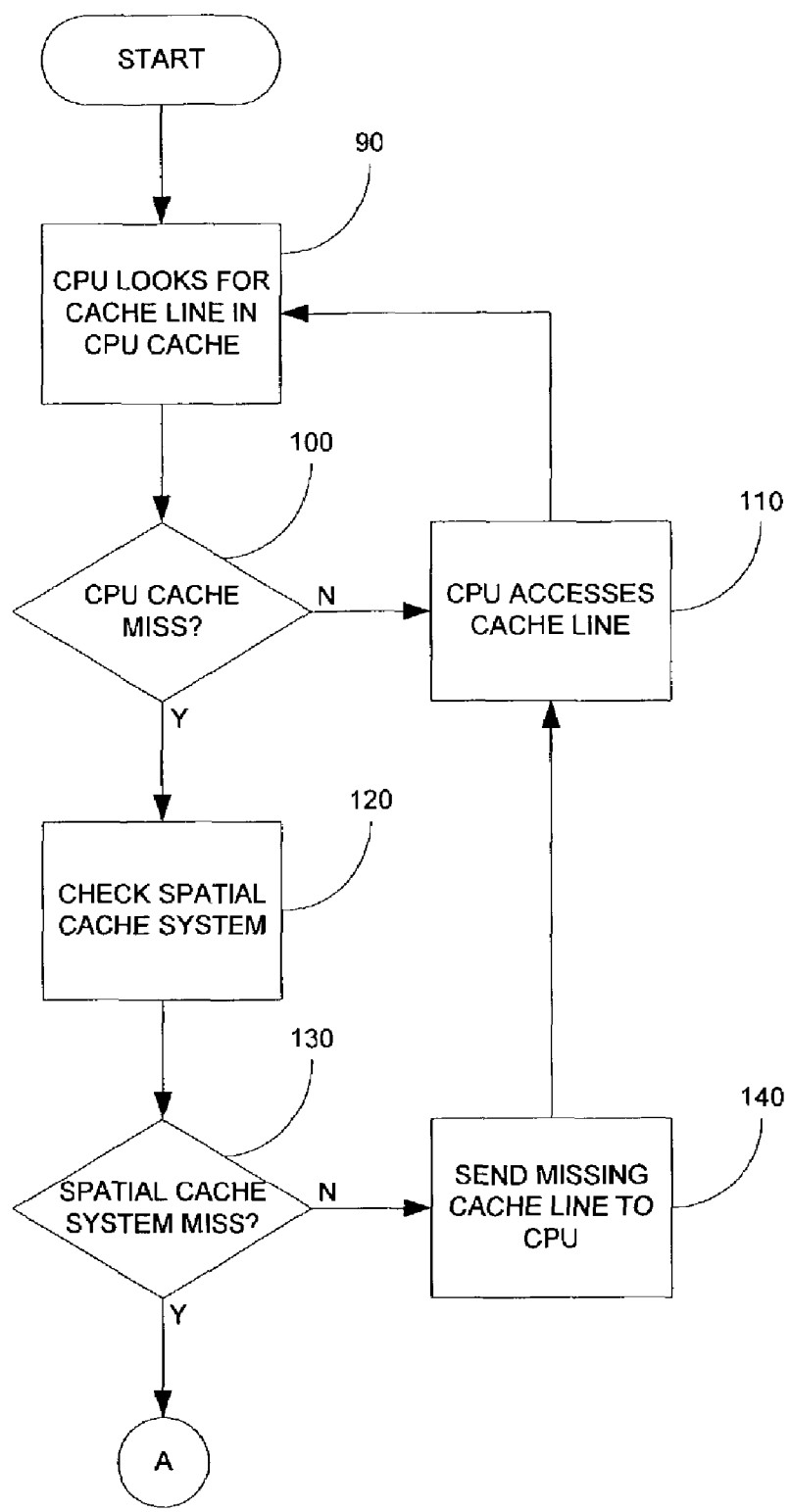
FIGS. 2A–2B show a flowchart illustrating an embodiment of a process that caches data streams when a central processing unit (CPU) attempts to read a particular cache line according to the present invention.
Figure 2B:
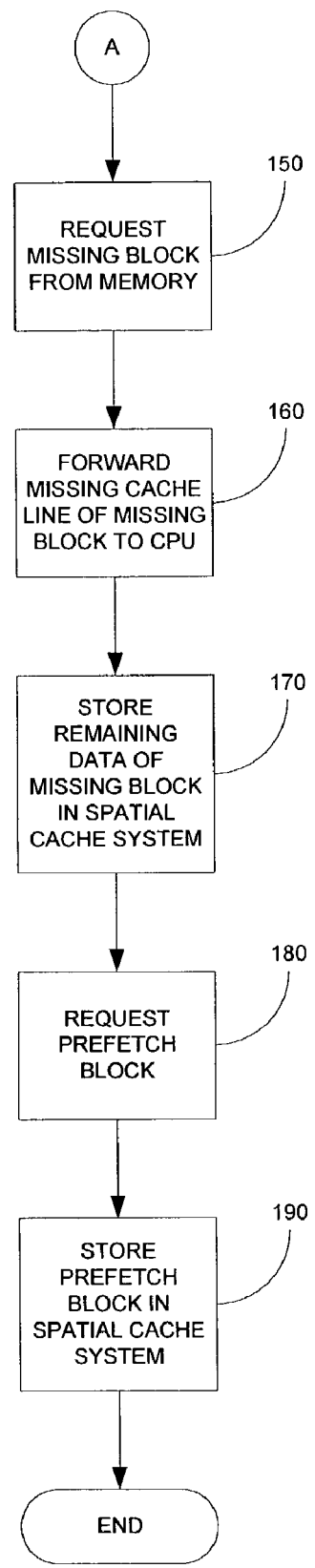

FIGS. 2A–B show a flowchart illustrating an embodiment of a process that caches data streams when the CPU 20 attempts to read a particular cache line according to the present invention. In step 90, the CPU 20 may be looking for a particular cache line (e.g., data in a particular cache line) of the CPU cache 60.

In query 100, it may be determined whether the particular cache line is presently in the CPU cache 60. If the particular cache line is presently stored in the CPU cache 60 (i.e., if it is not a CPU cache miss), then the CPU may access (e.g., read) the particular cache line in step 110. The process may then, for example, loop back to step 90 in which the CPU 20 may look for a CPU cache line (e.g., another CPU cache line). In query 100, if the particular cache line is not presently stored in the CPU cache 60 (i.e., if it is a CPU cache miss), then, in step 120, the CPU 20 may check the spatial cache system 70.

In query 130, it may be determined whether the particular cache line is presently in the spatial cache system 70. If the particular cache line is presently stored in the spatial cache system 70 (i.e., if it is not a spatial cache system miss), then, in step 140, the spatial cache system 70 may send the particular cache line to the CPU 20. In addition, as an option, the spatial cache system 70 may invalidate, delete or remove the particular cache line in the spatial cache system 70 that was sent to the CPU 20. The spatial cache system 70 may not expect, for example, the CPU 20 to request that particular cache line again in the near future. An invalidated cache line may become a more likely candidate for refilling in the spatial cache system 70. However, although invalidated, a cache line may still be read again by the CPU 20. In one embodiment, the above-described option may be used, for example, if the block size of the spatial cache system 70 and an L1 line size are the same or approximately the same. In subsequent step 110, the CPU 20 may access (e.g., read) the particular cache line residing in the spatial cache system 70. The process may then, for example, loop back to step 90 in which the CPU 20 may look for a cache line (e.g., another cache line) in the CPU cache 60.

In query 130, if the particular cache line is not presently stored in the spatial cache system 70 (i.e., if it is a spatial cache system miss), then, in step 150, the spatial cache system 70 may request a missing block from the memory 40. The requested missing block may include, for example, one or more cache lines including the particular cache line that was missed. In one example, in step 160, the spatial cache system 70 may receive the requested missing block and may forward the particular cache line of the requested missing block to the CPU 20. In another example, the particular cache line of the requested missing block may be directly forwarded to the CPU 20. In step 170, the spatial cache system 70 may store the remaining data (e.g., the cache lines other than the particular cache line) of the requested missing block in the spatial cache system (e.g., in a spatial cache). In one example, the spatial cache system 70 may store the entire requested missing block in, for example, its spatial cache, but the spatial cache system 70 may invalidate, delete or remove the particular cache line forwarded to the CPU 20. In another example, the spatial cache system 70 may not store the entire requested missing block, but instead may only store the remaining data of the requested missing block in the spatial cache system 70. In step 180, the spatial cache system 70 may request a prefetch block in light of the information relating to the missing block request in preparation for a possible future need of the CPU 20. For example, the spatial cache system 70 may request the next sequential block before or after the requested missing block depending upon, for example, a particular prefetch direction. In another example, the spatial cache system 70 may request a prefetch block that includes the next sequential line before or after the particular cache line that was missed. In yet another example, the spatial cache system 70 may request a prefetch block that may not be the next sequential block before or after the requested missing block or that may not be the next sequential line before or after the particular cache line that was missed. In some examples, the prefetch block may not be requested until the missing block request has been completed (e.g., the particular cache line that was missed has been sent to or received by the CPU 20). In some examples, the spatial cache system 70 may not prefetch a block that already resides in the spatial cache system 70. In step 190, the spatial cache system 70 may store the prefetch block in the spatial cache system 70 (e.g., in a spatial cache).

Figure 3:
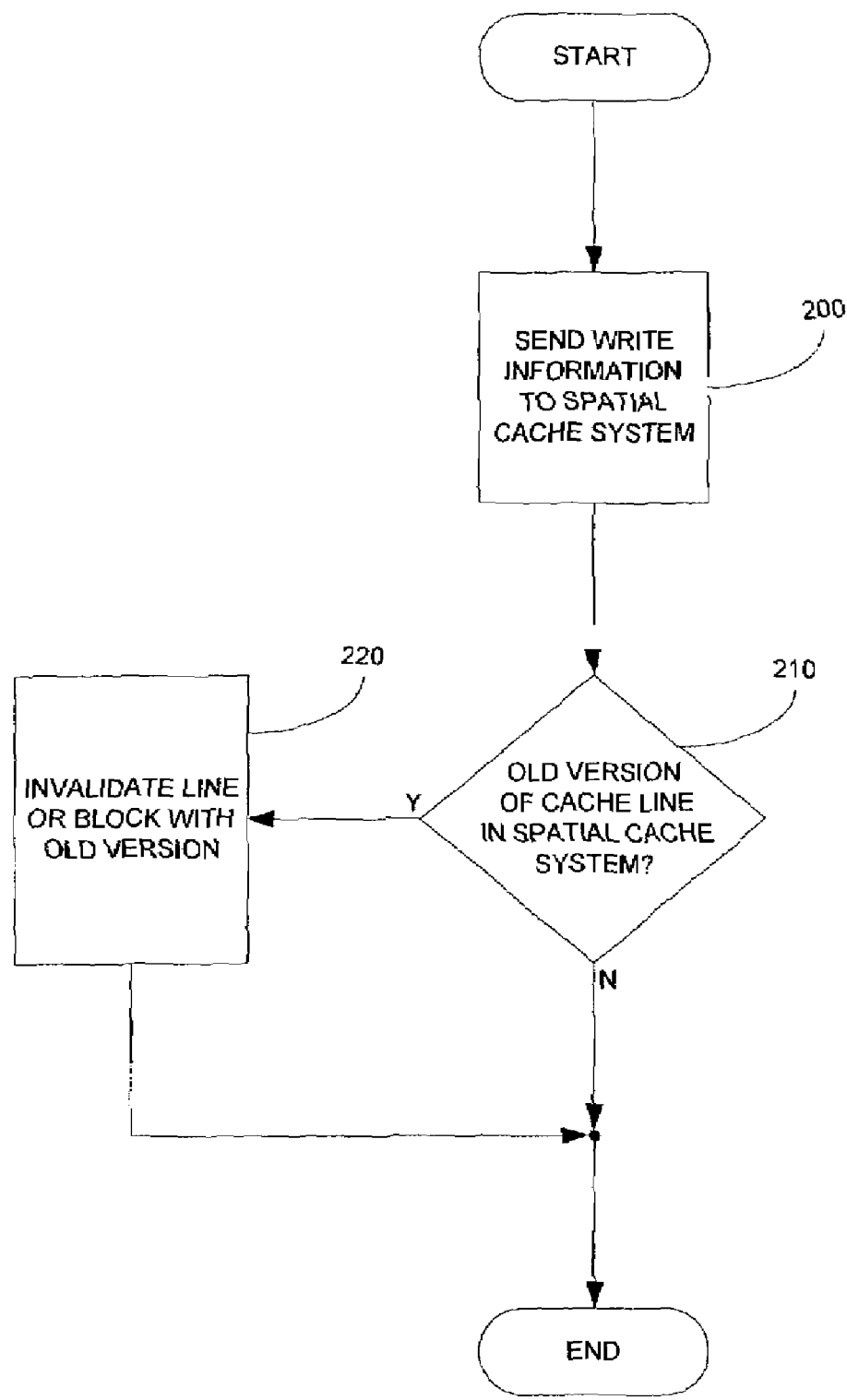
FIG. 3 shows a flowchart illustrating an embodiment of an invalidation process that may occur when a CPU attempts to write a modified cache line back to a memory according to the present invention.

FIG. 3 shows a flowchart illustrating an embodiment of an invalidation process that may occur when the CPU 20 attempts to write a cache line (e.g., a modified cache line) back to the memory 40 according to the present invention. During the normal operation of the CPU 20, the CPU 20 may modify some cache lines. At some point in time, the memory 40 may be updated to reflect the modified cache line (e.g., a copy-back process). In one example, the write data including, for example, the modified cache line or addressing information and a write request are sent from the CPU 20 to the memory scheduler 80.

Although the memory 40 may be updated with the modified cache line from the CPU, the spatial cache system 70 may still be carrying an old version of the cache line (e.g., an unmodified cache line). In step 200, the CPU 20 may also send information (e.g., address information) about the modified cache line to the spatial cache system 70. In query 210, the spatial cache system 70 may determine whether it is carrying (e.g., stored in its spatial cache) an old version of the cache line. If an old version of the cache line is stored in the spatial cache system 70, then, in step 220, the spatial cache system 70 may invalidate, delete or remove the old version of the cache line that is stored in spatial cache system 70. In another example, if the old version of the cache line is stored in the spatial cache system 70, then the spatial cache system 70 may invalidate, delete or remove the entire block containing the old version of the cache line that is stored in the spatial cache system 70.

The spatial cache system 70 may include at least one or more of the following advantages. Compared to some types of conventional cache (e.g., the stream buffers), the spatial cache system 70 may make more efficient use of its storage, particularly when the data streams may sometimes have variable lengths. In one embodiment, the spatial cache system 70 may make more efficient use of its storage when the data streams are very likely to have variable lengths. In addition, the spatial cache system 70 may support a large number of data streams with little impact on access time. Furthermore, the spatial cache system 70 may prefetch data streams with strides or jumps between accesses.

Compared to some types of conventional cache (e.g., a fully-functional L2 cache), the spatial cache system 70 may not employ some temporal aspects of conventional caching. Some conventional cache may store and protect data streams, which have been recently been used by the CPU 20, because the CPU 20 may reuse the data streams. On the other hand, in one embodiment of the spatial cache system 70, any piece of prefetched data in the spatial cache system 70 used by the CPU 20 may be invalidated and replaced by new streams of data. The spatial cache system 70 may be designed such that it assumes that the CPU 20 may not reuse, in the near future, a particular cache line that the CPU 20 has already accessed from the spatial cache system 70. Since the spatial cache system 70 may not invalidate previously accessed cache lines or may make such previously accessed cache lines inaccessible, the spatial cache system 70 may reuse the space occupied by the previously accessed cache lines or may designate the space occupied by the previously accessed cache lines as likely candidates for reuse (e.g., for refill). Thus, the capacity of the spatial cache system 70 may be much smaller than that of, for example, a fully functional L2 cache. Moreover, the spatial cache system 70 may not contain modified data. Thus, data that is modified by the CPU 20 may be invalidated in a single cycle in the spatial cache system 70. Data coherency may also be achieved, for example, by invalidating the entire spatial cache or an entire block in the spatial cache of the spatial cache system 70. Accordingly, data coherence between the CPU's read and write or between the CPU 20 and other devices can be easily maintained at no substantial impact on the performance of the CPU 20.

Figure 4:
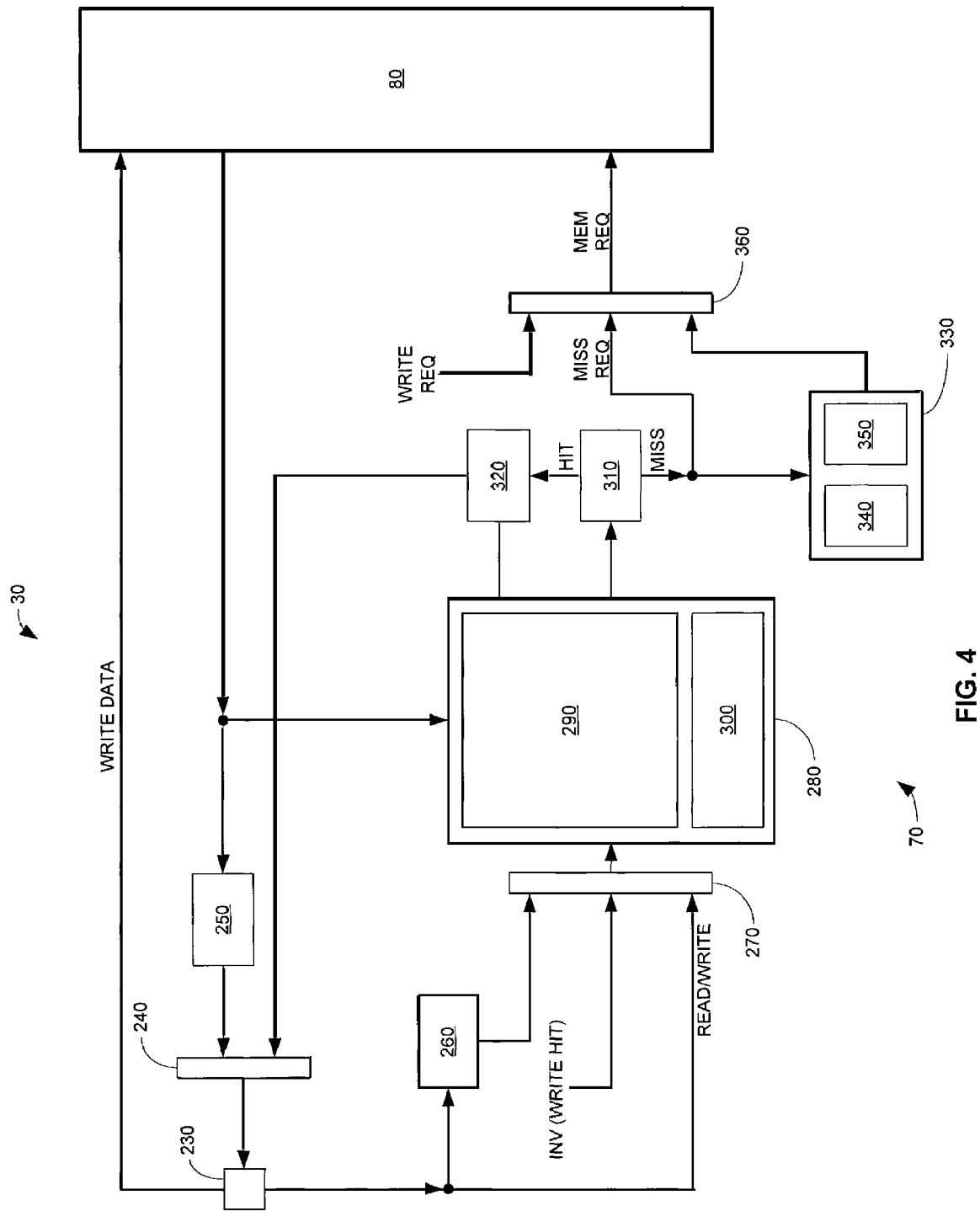
FIG. 4 shows an embodiment of a memory controller according to the present invention.

FIG. 4 shows an embodiment of the memory controller according to the present invention. In the illustrated embodiment, the memory controller 30 includes the spatial cache system 70. However, the present invention also contemplates the spatial cache system 70 being separate from the memory controller 30. The memory controller 30 may include, for example, a CPU interface 230, a selector 240, a read buffer 250, a prefetch controller 260, a selector 270, a spatial cache 280, a decision block 310, a buffer 320, a prefetch request buffer (PRB) 330, a selector 360 and the memory scheduler 80. The spatial cache 280 may include, for example, a data array 290 and a directory 300 (e.g., a tag array). The components may be coupled as illustrated in FIG. 4. However, some couplings have not been illustrated. For example, the CPU interface 230 may be coupled to the CPU 20. The memory scheduler 80 may be coupled, for example, to the memory 40 and to other functional devices 50.

The spatial cache 280 may include, for example, a data array 290 and a directory 300 (e.g., a tag array). The data array 290 may be adapted to store data prefetched from the memory 40. The data array 290 may be arranged into blocks in which each block may store one or more cache lines. In one example, the line size of an L1 cache in the CPU 20 may be 32 bytes and the block size of the spatial cache 280 may be 128 bytes. Thus, each block of the spatial cache 280 may store four cache lines. The directory 300 may be adapted to store the addresses of the data. Each entry in the directory 300 may include, for example, a block address and several valid bits. In one example, each valid bit may correspond to each unit of cache line belonging to the same block. For example, a block in the spatial cache 280 may include four cache lines. Accordingly, there may be four valid bits, one valid bit for each block in the directory 300. The block may be invalidated if, for example, all of its corresponding valid bits are in an off state. An invalidated block may become a likely candidate location for refilling future prefetched data, although, in one embodiment, content may still be accessed in the invalidated block. In one example, when a particular cache line in a particular block of the data array 290 is used by the CPU 20, the valid bit corresponding to the particular cache line may be set to an off state (i.e., an invalid state).

The PRB 330 may be adapted to store memory requests that are waiting to be sent or that have been sent but not yet completed. The memory requests may include, for example, block address information. Status bits may be used to indicate, for example, a valid request, a prefetch block request, a missing block request, a request already sent to memory, etc. The PRB 330 may include, for example, one or more data structures. For example, the PRB 330 may include a queue 340 and a stack 350. The queue 340 may be, for example, a first-in-first-out (FIFO) buffer that may store missing block requests. The stack 350 may be, for example, a last-in-first-out (LIFO) buffer that may store prefetch block requests. The information for a new request may be placed in an entry in the queue 340 or the stack 350 depending upon the type of request. In one example, a missing block request may be placed at the back of the queue 340 and a prefetch block request may be placed at the top of the stack 350. If the stack is full, the bottom entry may be deleted. The bottom entry may represent the oldest prefetch block request received by the PRB 330, but not yet sent out to the memory 40. The capacity of the queue 340 and the stack 350 may be determined, for example, by the maximum number of CPU misses that the prefetch control may support. The queue 340 or the stack 350 may be a LIFO buffer, FIFO buffer or any other type of buffer. The PRB 330 may also employ a single buffer that may store both missing block requests and prefetch block requests.

In operation, a CPU read request or a CPU write request may cause a look up in the spatial cache 280. A CPU read request may be generated in response, for example, to an L1 cache miss or a non-cacheable read. In one example, the CPU cache miss may result in a look up in the spatial cache 280. Non-cacheable read requests may be directly provided by the memory 40. In another example, the spatial cache 280 may stage non-cacheable data as long as the software can maintain the data coherency among the devices accessing the memory 40.

The look up in the spatial cache 280 may be passed from the CPU buffer 230 to the prefetch controller 260. The prefetch controller 260 may determine whether or not the spatial cache 280 contains the missing CPU cache line. The prefetch controller 260 may, via the selector 270, use address information from the directory 300 in determining whether or not the missing cache line is present in the data array 290. If the missing cache line is present in the data array 290, then the decision block 310 may determine that it is a spatial cache hit and may send the missing cache line to the CPU 20 via the buffer 320, the selector 240 and the CPU interface 230. Once the particular cache line in the data array 290 has been sent to the CPU 20, then the particular cache line in the data array 290 may be invalidated by, for example, setting a corresponding valid bit within a respective block address to an off state.

In addition to sending the missing CPU cache line to the CPU 20, the spatial cache system 70 may also generate a prefetch request in light of information concerning the missing cache line. For example, the spatial cache system 70 may check whether or not the next sequential block before or after the block containing the missing cache line resides in the spatial cache 280. If the spatial cache system 70 does not contain, for example, the next sequential block before or after the block containing the missing cache line, then the spatial cache system 70 may generate a prefetch request (e.g., in the prefetch control 260 or in the PRB 330) and store it in PRB 330 (e.g., in the stack 350). The prefetch request may be transmitted to the memory scheduler 80 via the selector 360 when it is popped from the stack 350. Priority may be given to requests stored in the missing request queue 340 over prefetch requests stored in the stack 350.

If the look up in the spatial cache 280 shows that the missing cache line is not in the spatial cache 280, then a spatial cache miss may have occurred. The spatial cache system 70 may then generate a missing block request in which the requested missing block may contain the missing CPU cache line. The missing block request may be stored in the PRB 330 (e.g., in the queue 340). Since the spatial cache system 70 may be able to handle multiple miss requests, a particular missing block request may have to wait for its opportunity in the queue 340 to be transmitted to the memory scheduler 80 via the selector 360. In addition to the missing block request, the spatial cache system 70 may also generate a prefetch block request. The prefetch block request may not be generated if the block requested is already residing in the spatial cache 280. The requested prefetch block may be the next sequential block before or after the block in the missing block request. In one example, the prefetch block may be part of a set of blocks. The memory 40 may be partitioned into sets of blocks. For example, a set of blocks may include block b and block b+1 or block b and block b−1, in which b−1, b and b+1 are block addresses in the memory 40. In one embodiment, blocks may form a set of aligned blocks. For example, block b and block b+1 or block b and block b−1 may be aligned blocks if the pair of blocks constitutes a larger memory block that is twice as large. In one embodiment, the block size is 64 bytes and an address (e.g., a memory address) contained in 32 bits. The two blocks having the same bits 31 to 8 of the address (i.e., address[31:8]) may be in the same set of aligned blocks. Bit 7 may have a value of 0 for one of the aligned blocks and bit 7 may have a value of 1 of the other block of the aligned blocks. Thus, the prefetch block request may depend upon which of the blocks in a set of aligned blocks is not the missing block. The prefetch block request may be stored in the PRB 330 (e.g., in the stack 350). In one example, the prefetch block request may not be sent to the memory scheduler 80 until the respective memory block request or any memory block request has been completed.

When the memory scheduler 80 fetches the requested missing block, the missing cache line may be sent to the CPU 20 via the read buffer 250, the selector 240 and the CPU interface 230. The rest of the data in the requested missing block (e.g., the other cache lines in the missing block) may be refilled into the spatial cache 280. The valid bits of these lines may be turned on (i.e., be in a valid state). The valid bit corresponding to the missing cache line sent to the CPU 20 may be turned off (i.e., cleared). In one example, the entire missing block is stored in the spatial cache 280, however, the cache line used by the CPU 20 (which was sent to the CPU 20) may be invalidated (i.e., the valid bit corresponding to the cache line used by the CPU 20 may be cleared). The spatial cache system 70 may then remove the missing block request from the PRB 330.

When a prefetched block is returned to the spatial cache system 70 from the memory 40, the entire prefetched block may be stored in the spatial cache 280 and all the corresponding valid bits may be set to a valid state. Information carried by the prefetched block (or a requested missing block) may be referenced with respect to information stored in the PRB 330. The respective memory request or an entry associated with the respective memory request may be used to determine where in the spatial cache 280 to refill the block of data. For example, the PRB 330 may include information relating to the least recently used block that may used to refill the block of data. After storing the data, the PRB entry may be removed.

A CPU write request may also result in a look up request in the spatial cache 280. During a write request, a write request and write data may be sent directly to the memory scheduler 80. However, information about the write request may also be sent to spatial cache system 70 which may determine whether or not there is a write hit in the spatial cache 280 (i.e., whether the cache line being written to the memory 40 already resides in a block of the spatial cache 280). If the cache line resides in the spatial cache 280 then, since it may be an older version of the cache line being written to the memory 40, it may be invalidated. The spatial cache system 70 may invalidate the cache line or the entire block containing the cache line. If a write miss occurs (i.e., the cache line being written does not reside in the spatial cache 280), then the request may be completed.

Some embodiments of the spatial cache system 70 may employ least recently used (LRU) bits. One or more LRU bits may be associated with each block in the data array 290.

If a read request from the CPU hits a block in the spatial cache 280, for example, corresponding to block address b, the requested L1 cache line in the block may be returned to the CPU. The LRU bit associated with the block may not be updated; however, the valid bit associated with the line in this block may be cleared. A block with all its valid bits cleared may be a candidate location for the next replacement as indicated by the LRU bit associated with the block.

Figure 5:
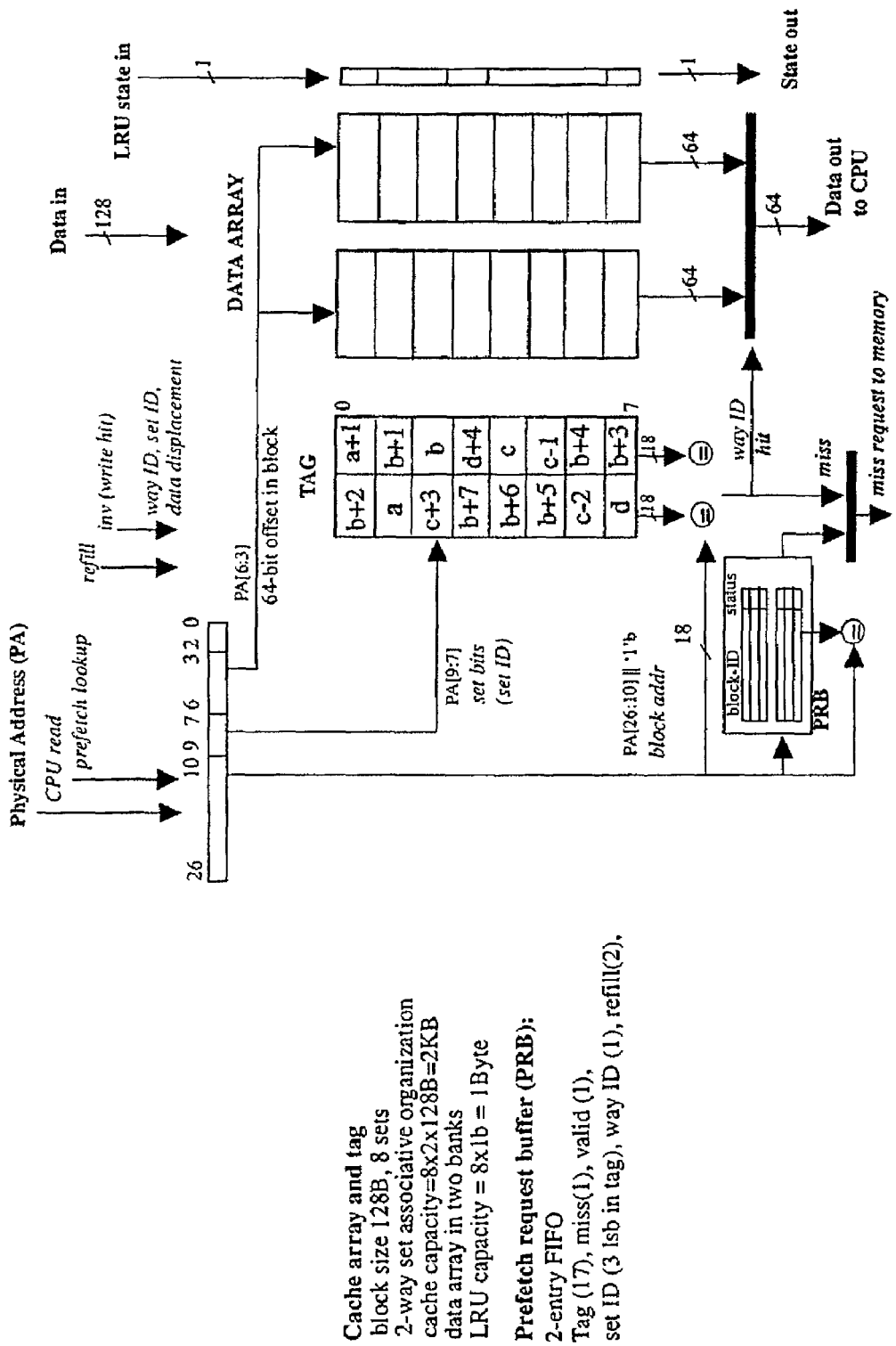
FIG. 5 shows a portion of an embodiment of a spatial cache system according to the present invention.

FIG. 5 shows a portion of an embodiment of the spatial cache system 70 according to the present invention. The spatial cache system 70 may be organized in a two-way set associative arrangement and the replacement may be controlled under an LRU replacement algorithm. The spatial cache 280 is shown with the tag array 300 and the data array 290 and illustrates an addressing scheme in the spatial cache 280. The quantities and numbering schemes are for illustration purposes only. Four streams a, b, c, d of various lengths are residing in the spatial cache 280 at the same time. A block may be placed in the spatial cache 280 according to particular bits of the set bits, for example, set_ID[9:7] of the access addresses to the block and the LRU bit of the set. When a block is first placed in the spatial cache 280, its status may be that of most recently used (MRU). The block that is a candidate for replacement may be the LRU in the set. When all the cache lines in a particular block are sent to the CPU 20, the block may be invalidated and the invalidated block may become the LRU.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for caching data streams, comprising:
   a spatial cache system coupled to a processing unit and to a memory, wherein:
   the spatial cache system is adapted to generate block requests for prefetched blocks and store prefetched blocks, each prefetched block comprising a plurality of cache lines; and
   the spatial cache system comprises:
      a prefetch control;
      a spatial cache; and
      a prefetch request buffer comprising a missing request gueue and a prefetch request stack that is separate from the missing request queue.

2. The system according to claim 1, wherein the spatial cache system is adapted to provide the processing unit with a cache line requested by the processing unit, the requested cache line not residing in one of the stored prefetched blocks and not residing in the processing unit.

3. The system according to claim 2, wherein, if the requested cache line does not reside in the spatial cache system, then the spatial cache system is adapted to generate a missing block request, the requested missing block comprising a plurality of cache lines including the requested cache line.

4. The system according to claim 3, wherein, if the requested cache line does not reside in the spatial cache system, then the spatial cache system is adapted to generate a prefetch block request, the requested prefetch block comprising a block with a block address that is sequentially related to a block address of the requested missing block.

5. The system according to claim 3, wherein, if the requested cache line does not reside in the spatial cache system, then the spatial cache system is adapted to generate a prefetch block request, the requested prefetch block comprising a particular block of a set of aligned blocks, the set comprising the requested missing block and the particular block.

6. The system according to claim 3, wherein the spatial cache system is adapted to receive the requested missing block and adapted to send the requested cache line to the processing unit.

7. The system according to claim 6, wherein one or more cache lines other than the requested cache line of the requested missing block are stored in the spatial cache system and can be used by the processing unit.

8. The system according to claim 1, wherein, if a cache line requested by the processing unit resides in one of the stored prefetched blocks and does not reside in the processing unit, then the spatial cache system is adapted to generate a prefetch block request unless the requested prefetch block already resides in the spatial cache system, the requested prefetch block having a block address that is sequentially related to a block address of the stored prefetch block comprising the requested cache line.

9. The system according to claim 1, wherein the spatial cache system is adapted to invalidate a cache line, residing in the spatial cache system, to be written into the memory by the processing unit.

10. The system according to claim 9, wherein the cache line residing in the spatial cache system is an older version of the cache line to be written into the memory by the processing unit.

11. The system according to claim 1, wherein the spatial cache system is adapted to invalidate a block stored in the spatial cache system, the block comprising a cache line to be written into the memory by the processing unit.

12. The system according to claim 1, wherein the prefetch control is coupled to the spatial cache, the spatial cache is coupled to the prefetch request buffer, and the prefetch request buffer comprises at least one queue for outgoing prefetch request messages.

13. The system according to claim 12, wherein the spatial cache comprises:
   a data array, at least a portion of which is arranged into blocks, each of which comprises a plurality of cache lines; and
   a directory that comprises addresses of the blocks.

14. The system according to claim 1, wherein when the prefetch request stack is full, the prefetch request stack is adapted to delete the oldest entry in the prefetch request stack to make room for a newest entry in the prefetch request stack.

15. The system according to claim 1, wherein the missing request queue comprises a first-in-first-out (FIFO) buffer.

16. The system according to claim 1, wherein the prefetch request stack comprises a last-in-first-out (LIFO) buffer.

17. The system according to claim 1, wherein the spatial cache system is adapted to handle a plurality of prefetch block requests and missing block requests.

18. The system according to claim 1, wherein the spatial cache system is adapted not to allow the requested cache line to be reused.

19. The system according to claim 1, wherein the spatial cache system is adapted to make a space comprising the requested cache line a more likely candidate to be refilled.

20. The system according to claim 1, wherein the spatial cache system is adapted to prefetch a particular block of a set of aligned blocks.

21. The system according to claim 20, wherein the set comprises a particular block and one of a first block and a second block, the first block residing in the spatial cache system and comprising the cache line requested by the processing unit, the second block not residing in the spatial cache system and comprising the cache line requested by the processing unit.

22. A method for reducing memory latency between a memory and a control processor, comprising:
providing a spatial cache system that is coupled to the memory and to the control processor, the spatial cache system comprising blocks stored in a spatial cache, the blocks comprising a plurality of cache lines;
if a cache line requested by the control processor does not reside in the control processor and does reside in the spatial cache, then the spatial cache system sends the requested cache line to the control processor; and
if the cache line requested by the control processor does not reside in the control processor and does not reside in the spatial cache, then the spatial cache system generates a missing block request and generates a prefetch block request, wherein:
each of the missing block and the prefetch block comprise a plurality of cache lines;
the spatial cache system generates the missing block request by, at least in part, storing the missing block request in a missing request Queue; and
the spatial cache system generates the prefetch block request by, at least in part, storing the prefetch block request in a prefetch request stack that is separate from the missing request queue.

23. The method according to claim 22, wherein the missing block request requests to fetch a missing block that comprises the requested cache line.

24. The method according to claim 23, wherein the prefetch block request requests to fetch a prefetch block having a block address that is sequentially related to a block address of the missing block.

25. The method according to claim 22, further comprising:
receiving a missing block from the memory in response to the missing block request;
sending the requested cache line of the missing block to the control processor; and
storing cache lines other than the requested cache line of the missing block in the spatial cache.

26. The method according to claim 22, further comprising:
receiving a missing block from the memory in response to the missing block request;
sending the requested cache line of the missing block to the control processor;
storing the missing block in the spatial cache; and
making the requested cache line stored in the spatial cache inaccessible to the control processor after the requested cache line has been sent to the control processor.

27. The method according to claim 22, comprising:
invalidating a particular cache line residing in the spatial cache if an updated version of the particular cache line is to be written into the memory by the control processor.

28. The method according to claim 22, comprising:
if the cache line requested by the control processor does not reside in the control processor and does reside in the spatial cache, then the spatial cache system sends the requested cache line to the control processor and no longer makes the requested cache line in the spatial cache available to the control processor.

29. The method according to claim 22, comprising:
if the cache line requested by the control processor does not reside in the control processor and does reside in the spatial cache, then the spatial cache system sends the requested cache line to the control processor and indicates that a space in which the requested cache line resided is a more likely candidate to be refilled.

30. A method, in a spatial cache system, for reducing memory latency between a memory and a control processor, the method comprising:
if a cache line miss occurs in the control processor, then receiving a request for the missed cache line from the control processor;
determining if the requested cache line resides in a spatial cache;
if the requested cache line does reside in the spatial cache, then sending the requested cache line to the control processor; and
if the requested cache line does not reside in the spatial cache, then generating a missing block request and a prefetch block request, wherein each of the missing block and the prefetch block comprise a plurality of cache lines; and
prefetching a particular block of a set of aligned blocks, wherein the set of aligned blocks comprises the particular block and one of a first block and a second block, the first block residing in the spatial cache and comprising the requested cache line, the second block not residing in the spatial cache and comprising the requested cache line.

31. The method according to claim 30, wherein the missing block request requests to fetch a missing block that comprises the requested cache line.

32. The method according to claim 31, wherein the prefetch block request requests to fetch a prefetch block having a block address that is sequentially related to a block address of the missing block.

33. The method according to claim 31, comprising:
receiving a missing block from the memory in response to the missing block request;
sending the requested cache line of the missing block to the control processor; and
storing cache lines other than the requested cache line of the missing block in the spatial cache.

34. The method according to claim 30, comprising:
receiving a missing block from the memory in response to the missing block request;
sending the requested cache line of the missing block to the control processor;
storing the missing block in the spatial cache; and
making the requested cache line stored in the spatial cache inaccessible to the control processor after the requested cache line has been sent to the control processor.

35. The method according to claim 30, further comprising:

invalidating a particular cache line residing in the spatial cache if an updated version of the particular cache line is to be written into the memory by the control processor.

36. The method according to claim 30, further comprising:
if the requested cache line does reside in the spatial cache, then after sending the requested cache line to the control processor making the requested cache line in the spatial cache no longer available to the control processor.

37. The method according to claim 30, further comprising:
if the requested cache line does reside in the spatial cache, then after sending the requested cache line to the control processor, making a space in which the requested cache line resided a more likely candidate to be refilled.

38. The method according to claim 30, wherein generating a missing block request comprises storing the missing block request in a missing request queue.

39. The method according to claim 30, wherein generating a prefetch block request comprises storing the prefetch block request in a prefetch request stack.

40. The method according to claim 30, wherein the prefetch request stack comprises a last-in-first-out (LIFO) buffer.

* * * * *

UNITED STATES PATENT AND TRADEMARK OFFICE
CERTIFICATE OF CORRECTION

PATENT NO. : 7,167,954 B2 Page 1 of 1
APPLICATION NO. : 10/294091
DATED : January 23, 2007
INVENTOR(S) : Kimming So and Chin Wang It is certified that error appears in the above-identified patent and that said Letters Patent is hereby corrected as shown below:

Column 9, line 52 delete "gueue" and insert --queue--.
Column 11, line 33 delete "Queue" and insert --queue--.
Column 13, line 9 delete "processor making" and insert --processor, making--.

Signed and Sealed this

Twenty-seventh Day of March, 2007

JON W. DUDAS
*Director of the United States Patent and Trademark Office*